July 7, 1964  H. J. BRUDNER  3,139,753
DIGITAL METER

Filed Feb. 20, 1962   5 Sheets-Sheet 1

INVENTOR.
HARVEY J. BRUDNER
BY Blum, Moscovitz,
Freedman and Blum
ATTORNEYS

INVENTOR.
HARVEY J. BRUDNER
ATTORNEYS

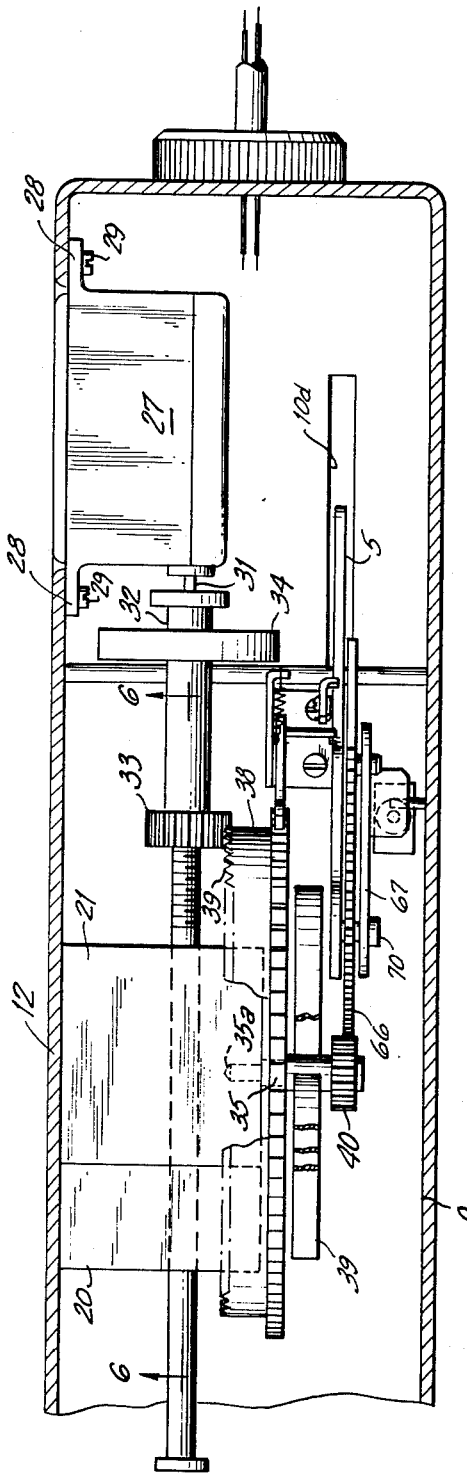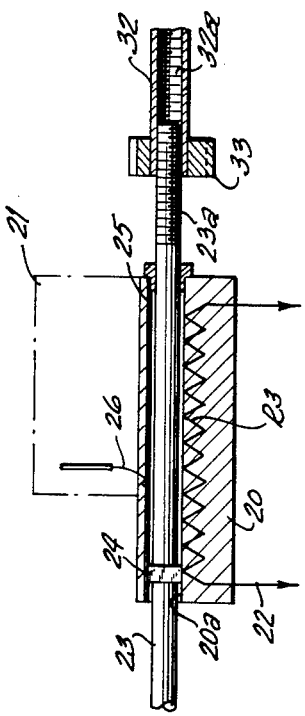

July 7, 1964

H. J. BRUDNER
DIGITAL METER 3,139,753

Filed Feb. 20, 1962

INVENTOR.
HARVEY J. BRUDNER
BY Blum, Moscovitz,
Friedman and Blum
ATTORNEYS

United States Patent Office 3,139,753
Patented July 7, 1964

3,139,753
DIGITAL METER
Harvey J. Brudner, 372 Central Park W., New York, N.Y.
Filed Feb. 20, 1962, Ser. No. 174,205
5 Claims. (Cl. 73—362)

This invention relates to an improved device for measuring physical variables which are subject to sensing by a transducer which converts the energy of the physical variable into an electrical signal. In particular, the invention relates to improved means for determining the value of such electrical signal corresponding to the value of the physical variable which is to be measured.

Without limitation thereto, the invention is highly suitable to the measurement of temperature. In fact, while it is to be understood that the invention has other applications, one object of the invention is to provide an improved device for measuring temperature. In such applications, the transducer which can be used is a thermistor, which is a resistor whose resistance changes in accordance with ambient temperature. Such thermistor can be connected in appropriate electric circuit, and it will be apparent that an electric signal can be produced which varies in accordance with the temperature which is to be measured.

An important object of the invention is to provide improved readout means to replace the galvanometer type of readout means which has commonly been associated with the electrical signal resulting from the use of a thermistor as a temperature measuring device.

In accordance with a preferred embodiment of the invention, the thermistor is connected in a bridge type circuit as one of the arms thereof, said thermistor arm being opposed by an arm including a potentiometer having a movable contact. For a given ambient temperature, the contact of the potentiometer can be moved to a position wherein the output voltage of the bridge is minimum. Further in accordance with the invention, a difference amplifier or other appropriate electronic device may be connected to the output of the bridge and may be adapted to produce a signal only when the bridge is in electrical balance. When the signal is produced, the movement of the movable contact on the potentiometer may be stopped. Any appropriate readout device, such as a digital device, may be coupled to the potentiometer and may be calibrated so as to indicate the temperature corresponding to the balancing position of the movable arm of the potentiometer.

Further in accordance with the preferred embodiment of the invention, spring motor means or other suitable means may be provided to drive the movable potentiometer contact through a range, and the output signal resulting from the balancing position of the movable arm may be used to control and actuate an electromechanical brake or other electromechanical means which automatically stops the movement of the potentiometer contact when the balancing position is reached.

As one important application of the invention, the thermistor may be embodied in a probe, and the operation of the device may be controlled by the cocking of a trigger or similar device. It has been found that such probe type device is highly advantageous in the measuring of clinical temperatures for medical purposes, since the temperature can be read within a time period of no more than approximately one second, and since a fixed digital reading can be obtained which can be read at leisure. Of course, a probe device of this type may be used to measure temperatures in many other applications.

As another important feature of the invention, the temperature measuring device can be entirely portable, can be small enough to be carried in the clothing and may be powered by batteries, either of the replaceable or chargeable type.

Other objects and advantages of the invention will become apparent from the following description, in conjuction with the annexed drawing, in which preferred embodiments of the invention are disclosed.

Figure 2:
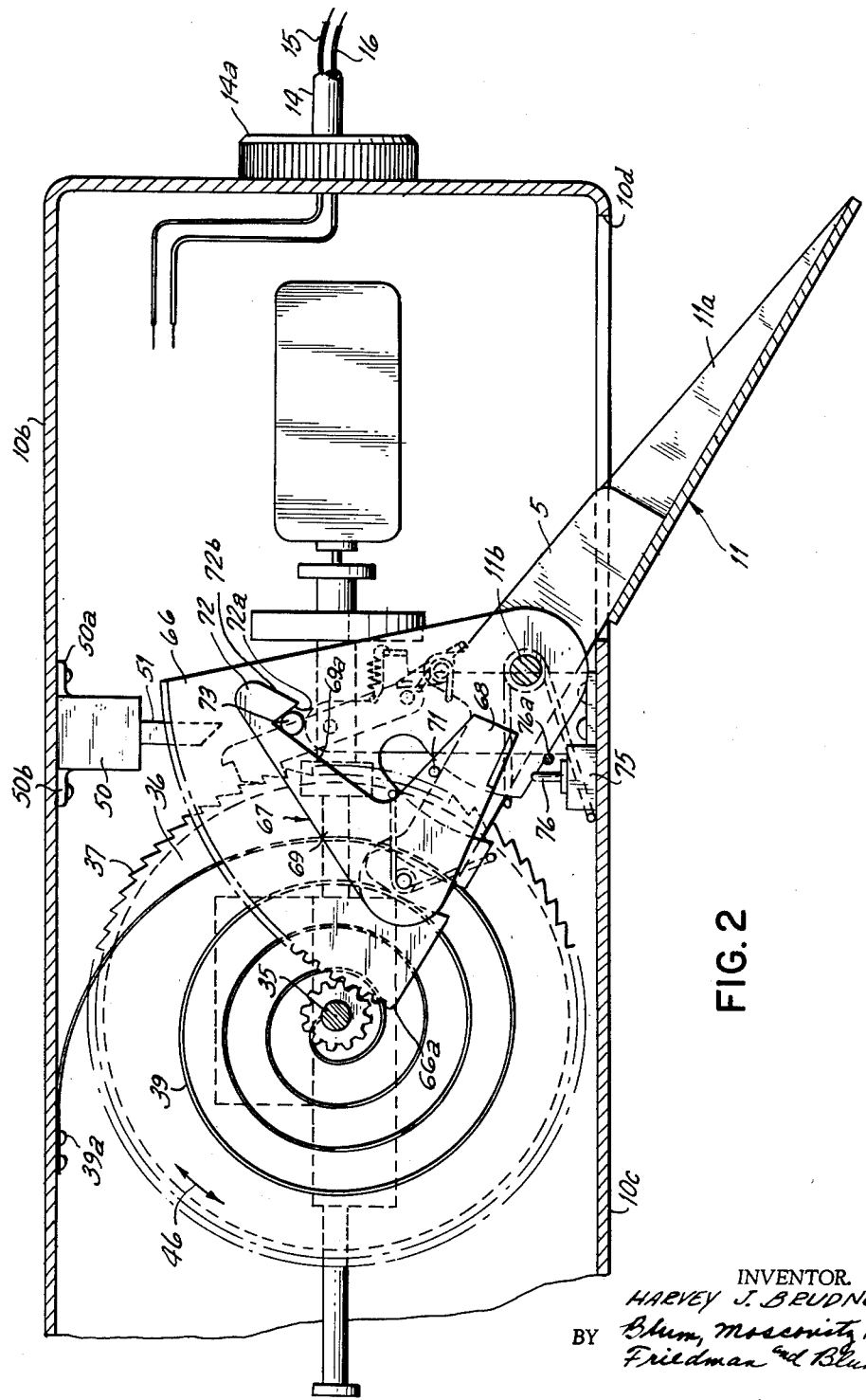
FIG. 2 is a longitudinal section of the device, partly broken away, showing the normal condition of the device, prior to taking a reading, with the trigger in its normal outwardly biased position and with the brake dog locked against the operating mechanism to prevent any change in the output reading of the device.
Figure 3:
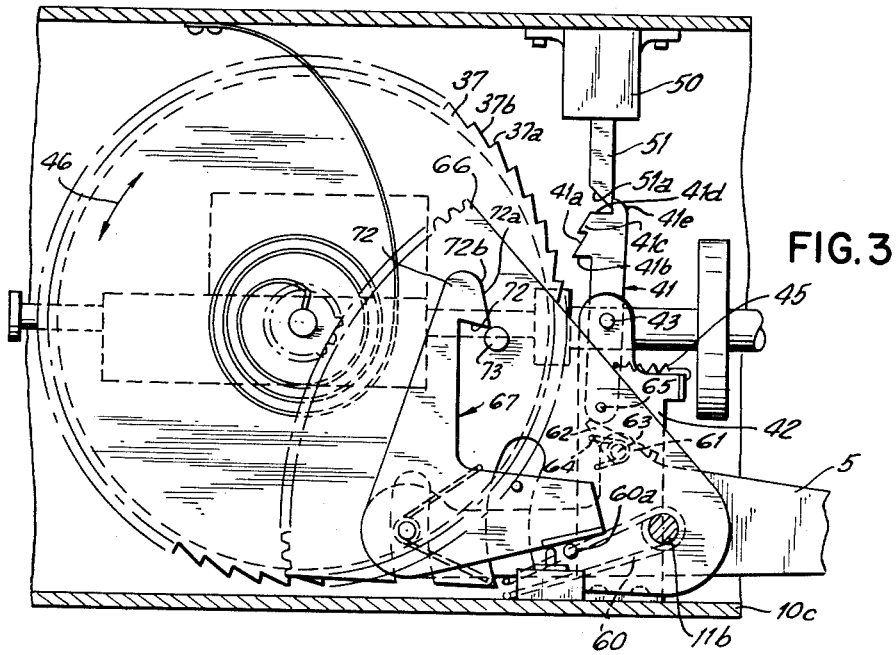
FIG. 3 is a fragmentary view similar to FIG. 2, showing the device after the trigger has been depressed so as to move the parts to initial operating position, wind the main drive spring, move the brake dog to release position and close the switch to energize the electric circuit.
Figure 4:
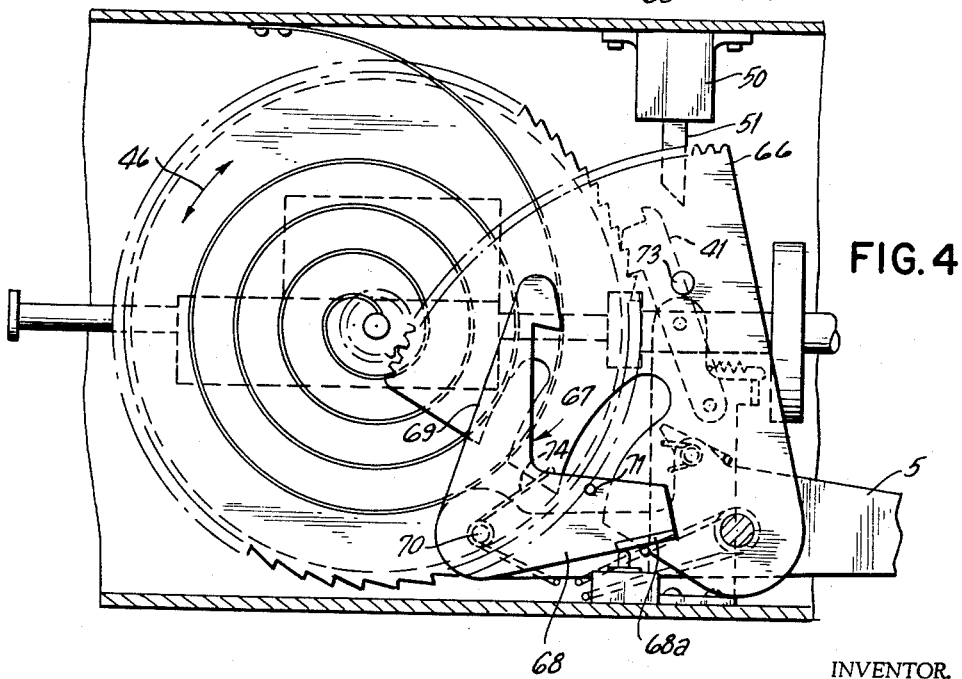

FIG. 4 is a view similar to FIG. 3, but showing the device after the movable contact of the potentiometer has reached its position corresponding to balance of the bridge, and showing the brake dog again in operative position. In this view, the trigger is still depressed. Upon release of the trigger, the parts return to their positions of FIG. 2.

FIG. 5 is a top plan view of the device with the top of the casing removed.

FIG. 6 is a fragmentary section on line 6—6 of FIG. 5.

Figure 7:
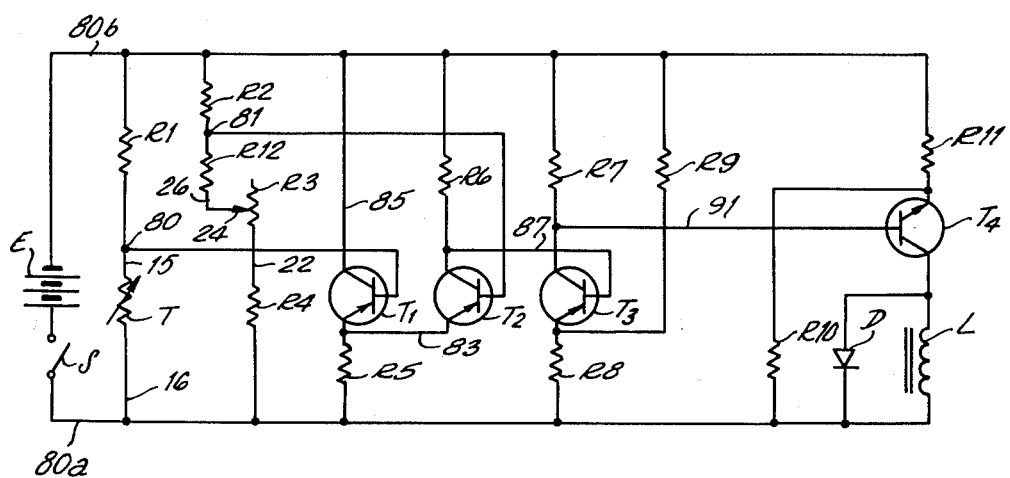

FIG. 7 is a diagrammatic view of the electric circuit of the device.

Figure 8:
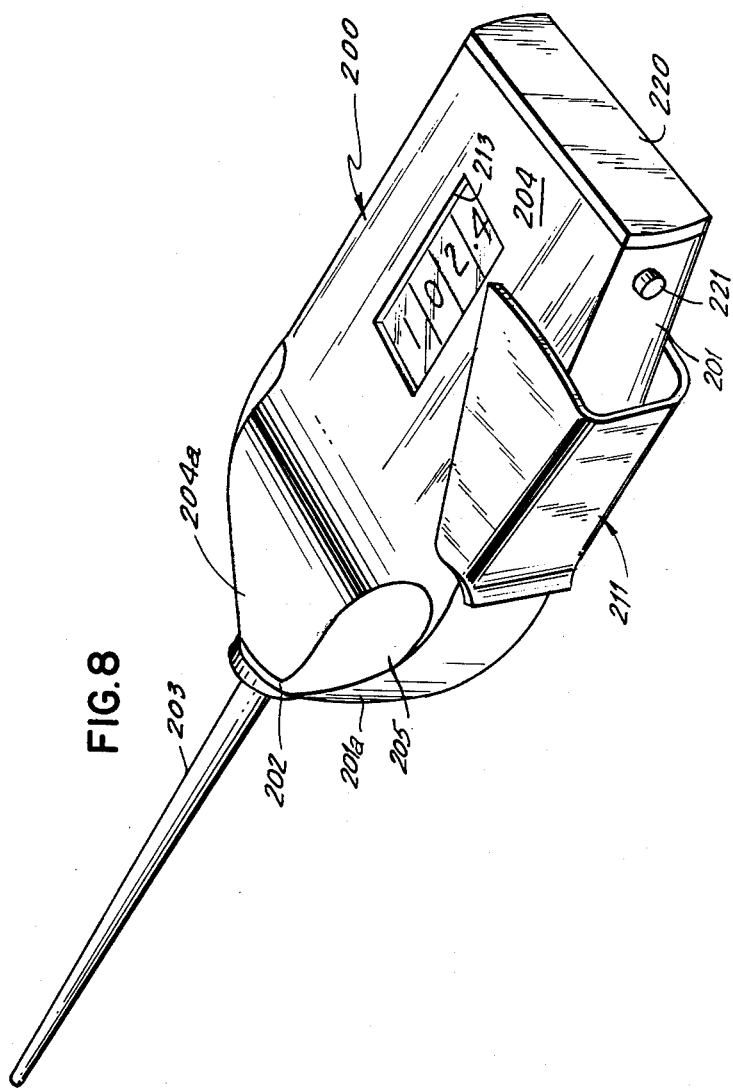

FIG. 8 is a perspective view of a modification of the invention.

Figure 1:
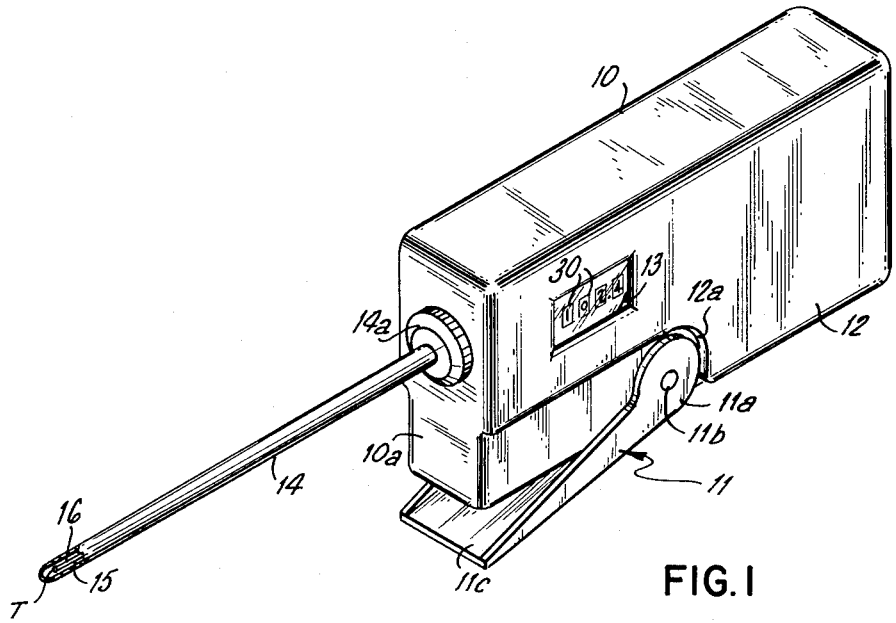
FIG. 1 is a perspective view of one preferred embodiment of the invention, wherein the thermistor is incorporated in a probe attached to a portable casing containing the operating parts of the device and controlled by an external trigger.

Upon reference to the drawings in detail, it will be noted that FIG. 1 shows a generally rectangular casing 10. Said casing 10 may have any appropriate shape, but is preferably sized and shaped so as to be conveniently hand held, and so that the trigger 11 may be conveniently operated by the same hand that holds the casing 10. Optionally, the length of casing 10 may be its greatest dimension, and its height its second greatest dimension, as shown in FIG. 1. Casing 10 has side walls 12 and 9 (FIG. 5) and top and bottom walls 10b and 10c (FIG. 2). Side wall 12 has a window 13 through which the digital readout member is visible. Optionally, the lower front of each side wall is offset inwardly, as shown at 12a in FIG. 1, to provide a recess for slidable reception of the side flanges 11a of trigger 11, said side flange 11a being pivoted adjacent its rear end to the offset wall portion 12a by means of any suitable lateral pivot 11b, such pivot being shown diagrammatically. The bottom edges of trigger flanges 11a are connected by plate 11c which underlies the bottom wall of casing 10. FIG. 1 shows the normal position of trigger 11, in which the front portion of trigger plate 11c is spaced from the bottom of the casing. It will be apparent that the casing may be held in the hand, with fingers engaging the underside of plate 11c, and that the trigger may be readily depressed toward the casing to actuate the mechanism.

Also as shown in FIG. 1, an elongated, longitudinally extending hollow probe tube 14 is fixed to the front wall 10a of casing 10 by any suitable means, such as adapter 14a (not shown in detail). A thermistor T is located in probe tube 14 adjacent its closed front end, and leads 15 and 16 are connected to the respective ends of thermistor T and extend rearwardly through tube 14 and into casing 12 (FIG. 5). Said thermistor T and its leads 15 and 16 are shown diagrammatically in the circuit diagram of FIG. 7.

Upon reference to FIGS. 2, 5 and 6, it will be noted that potentiometer casing 20 is fixed to the inner face of casing side wall 9 adjacent the lower rear thereof. A further casing 21, which contains the electronic components, is optionally mounted on the top of casing 20 and against side wall 9, both such casings being mounted by any suitable means (not shown). The interior of casing 20 has a longitudinal through square bore 20a, in which longitudinally extending potentiometer resistance coil R3, also shown diagrammatically in FIG. 7, is located. Said potentiometer resistance R3 has a lead 22 which is extended outwardly through the wall of casing 20 and may be led into casing 21 by any suitable means (not shown). Cylindrical shaft 23 extends slidably through the bore 20a and has fixed thereto a wiper contact 24 which makes electrical contact with the resistance R3. Said contact 24 also makes wiping engagement with a longitudinally extending bar 25 in bore 20a. Contact 24 is square and is non-rotatable but slidable in bore 20a. Lead 26 extends from bus bar 25 through the wall of casing 20 and into casing 21.

Counter casing 27 has longitudinal front and rear ears 28 which are fixed by screws 29 to side wall 12 so that the outer face of counter casing 27 overlies window 13. The counter may be any conventional rotary digital counter, and may have windows 30 visible through window 13 and in which individual digits are visible. By way of example, FIG. 1 shows such windows 30 and shows the numbers successively 1, 0, 2 and 4 displayed therein, which for illustrative purposes may be assumed to correspond to a reading of 102.4° F. The counter in casing 27, as indicated above, is conventional, and may be driven by any appropriate rotary shaft which is shown to extend longitudinally and to extend out of the rear of casing 27, such drive shaft being designated by the reference numeral 31.

Shaft 31 and shaft 23 are aligned. Shaft 31 extends into and is fixedly attached by any suitable means (not shown) in hollow sleeve 32 which also extends longitudinally. Said sleeve 32 is internally screw threaded, as indicated by the reference numeral 32a, and the screw threaded rear end portion 23a of shaft 23 is screwed into the bore of sleeve 32 as indicated in FIG. 6.

A small drive gear 33 is fixedly mounted upon sleeve 32 at the rear thereof. Fly-wheel assembly 34 is also optionally mounted upon sleeve 32 intermediate the ends thereof. Fly-wheel assembly 34 is any conventional assembly having conventional overrunning clutch means which are engaged during the operative stroke of the potentiometer contact so as to serve as a brake to excessive acceleration of the parts as the result of the unwinding of spring 39. The clutch means of assembly 34 are disengaged during the cocking stroke of the trigger so as not to resist the winding of the spring motor 39. Such clutch means are shown in "Miniature One-Way Clutch," a publication of the Miniclutch Company, Hamden, Connecticut.

It will be apparent that by turning gear 33 and hence sleeve 32, shaft 23 may be moved longitudinally and counter drive shaft 31 may be rotated.

While sleeve 32 could be turned manually, it is preferred to provide spring motor means actuated by trigger 11 for turning gear 33, as well as electromechanical brake means for stopping the action of the spring motor when the proper reading has been obtained. Accordingly, a stub shaft 35 extends laterally and turnably in an appropriate bearing of casing 21 and protrudes outwardly of the side of casing 20 toward wall 9. The exact configuration of shaft 35 as required for supporting the members mounted thereon is conventional and will not be described in detail.

A large disc 36 is fixedly mounted by any suitable means upon shaft 35 adjacent casing 20 and has teeth 37 on its outer periphery. A cylindrical flange 38 is fixed to one face of disc 36 and extends toward wall 12, and carries upon its inner edge gear teeth 39 which mesh operatively with gear 33. Spiral torsion spring 39 is wound about shaft 35, with one end of spring 39 fixed to shaft 35 and the other end of spring 39 fixed by rivets 39a to the top wall 10b of casing 10. A further small gear 40 is fixedly mounted on the free end of shaft 35.

In order to provide for braking the movement of disc 36, brake dog 41 is supported by means of bracket 42. Said bracket 42 is fixed to the bottom wall 10c of casing 10 and is upwardly elongated therefrom, said bracket 42 being located slightly forwardly of disc 36. Brake dog 41 is in the form of a generally vertical lever attached by lateral pivot 43 intermediate its ends to bracket 42 near the top thereof. Brake dog 41 carries teeth 41a on its upper rear, such teeth 41 being positioned in opposition to and adapted to mesh operatively with disc teeth 37.

Spring 45 connects the lower end portion of brake dog 41, below pivot 43, to bracket 42, and normally urges the teeth 41a into meshing engagement with teeth 37, as is clearly shown in FIG. 2. The normal direction of movement of disc 36, during unwinding of spring 39, is in the direction of arrow 46, this being the counterclockwise direction as taken in FIG. 2. Accordingly, the teeth 37 and 41a are shaped as shown in the drawing, so that in the position of dog 41 of FIG. 2, the trailing radial face 41b of a tooth 41a will engage the leading radial face 37a of a tooth 37 to brake disc 36. As the braking dog moves into its position of FIG. 2, the tooth surfaces 37b and 41c abut each other slidably, so as to insure that the braking action will take place without slippage and without breaking of teeth.

Solenoid casing 50 has ears 50a which are fixed to casing top wall 10b by any suitable means. Said solenoid casing 50 contains solenoid coil L (FIG. 7) which controls solenoid plunger 51. Said solenoid plunger 51 extends vertically and is axially movable. Plunger 51 is biased downwardly by a spring (not shown). When solenoid 50 is energized, plunger 51 is raised. In the release position of brake dog 41, shown in FIG. 3, the lower end of plunger 51 is adjacent the top surface 41d of dog lever 41 which then extends generally vertically; and lever 41 has a projection 41e on said surface 41d which extends in front of and is caught by plunger 51. When solenoid coil L is energized and plunger 51 is raised, it clears projection 41e and lever 41 then moves to its braking position of FIG. 2. When lever 41 is moved by trigger 11 in the reverse direction, projection 41e strikes the upwardly rearwardly inclined cam surface 51a of plunger 51 and raises it against the action of the spring until projection 41e is again located in front of plunger 51, which then returns to its position to lock lever 41.

The bottom plate of trigger 11 has a transverse longitudinally elongated flange 5 which extends through an opening 10d in the front of casing bottom wall 10c and hence into the housing. Torsion spring 60 around pivot 11b has one end fixed at 60a to trigger 11 and has its other end bearing against casing wall 10c so as to bias trigger 11 to its position of FIG. 2. In this position, trigger flange 5 abuts casing wall 10c, which serves as a stop to movement of trigger 11 under the action of spring 60. The upper end of trigger flange 11a has an ear 61 upon which toggle lever 62 is mounted by lateral pivot 63. Any suitable spring 64 such as a torsion spring around pivot 63 appropriately interconnects trigger flange 5 and toggle lever 62 so as to bias the upper end of lever 62 forwardly as shown in the drawing. In the normal position of trigger 11, shown in FIG. 2, the upper end of lever 62 opposes the lateral pin 65 on the lower end of lever 41. As the trigger is being cocked, turning it in counterclockwise direction as taken in FIG. 2, the upper end of lever 62 makes wiping contact with pin 65 and moves lever 41 from its braking position of FIG. 2 to its position of FIG. 3 in which it is locked in release position by plunger 51, placing the spring 45 under tension. Upon further cocking movement of the trigger, lever 62 is turned on its pivot 63 against the action of spring 64 so as to ride under pin 65. Lever 62 then clears pin 65 and rocks back on its pivot as shown in FIG. 3.

When brake dog 41 is in locking position and the trigger is released, upon return of the trigger back towards its normal position the upper face of lever 62 strikes pin 65 and lever 62 is rocked in the counterclockwise direction until it moves clear of pin 65 back to its position of FIG. 2.

Trigger 11 is operatively coupled to gear 40 by means of sector gear 66. Said sector gear 66 is also turnably mounted on pivot 11b. The outer periphery of sector gear 66 has gear teeth 66a which mesh operatively with the teeth of gear 40. Pawl 67 couples trigger 11 and sector gear 66. Pawl 67 has a generally horizontal arm 68 and a generally vertical arm 69. The junction of said arms 68 and 69 is connected by pivot 70 to the rear end of lever flange 11a, rearwardly of pivot 11b.

The upper end of pawl arm 67 has a rearwardly facing hook 72 which engages over lateral pin 73 on sector 66 in the normal position of trigger 11 shown in FIG. 2. There is a substantial spring between the bottom surface 72a of hook 72 and arm 68. Torsion spring 74 around pivot 70 is coupled at its ends respectively to pawl arm 68 and trigger 11 so as to bias pawl 67 in clockwise direction as taken in FIG. 2. Lateral pin 71 on arm 68 engages against the top of trigger flange 5 to serve as a stop against such movement of pawl 67.

Switch casing 75 is fixedly mounted upon the upper surface of bottom wall 10c, and contains normally open switch S (FIG. 7). Button 76 is the operating button for switch S and extends upwardly through casing 75. A spring (not shown) biases button 76 upwardly. When button 76 is depressed, it closes switch S. When trigger 11 is cocked, hook 72 engages operatively against pin 73 and carries sector 66 in counterclockwise direction about pivot 11b, as taken in FIG. 2. Gear 40 is accordingly turned in the opposite sense and winds up spring 39. Also, gear 33 is turned so as to move the potentiometer contact and the counter to start positions.

Just before the trigger reaches the end of its operating stroke, lateral flange 68a on arm 68 strikes button 76 and depresses it, thereby actuating the electric circuit. Upon further cocking movement of the trigger, flange 68a strikes lateral stop pin 76a on casing 10, and pawl 67 is pivoted in the counterclockwise direction about pivot 70, thereby clearing hook 72 from pin 73, as shown in FIG. 3. Since, as described above, the cocking stroke of the trigger also moves brake lever 41 to release position, spring 39 then unwinds and turns disc 36 in its counterclockwise direction (as taken in FIG. 2). The potentiometer contact and the counter are then moved in an operating stroke. Gear 40 drives sector 66 in clockwise direction about the axis of pivot 11b (as taken in FIG. 2). When solenoid coil L is energized, braking dog 41 locks disc 36 from further movement. FIG. 4 illustrates the position of parts on the illustrative assumption that the potentiometer contact moves through less than its complete range before coil L is energized. Upon release of the trigger and its return to its normal position, the cam front edge 72b of hook 72 strikes pin 73 and rides over it, against the action of spring 74, until the hook clears pin 73 and pin 73 abuts the rear surface 69a of lever arm 69. Hook 72 is spring biased against pin 73. While FIG. 2 shows the condition of the parts corresponding to previous movement of contact 24 through its entire operating range, it will be understood that if this is not the case, pin 73 will be positioned intermediate the lower surface 72a of hook 72 and pawl arm 68, in position to be operatively engaged by hook 72 when the trigger is cocked.

*Electric Circuit*

The electric circuit of the device includes a voltage source E which is connected in series with switch S. The negative terminal of voltage source E is connected to line 80b. The positive terminal of voltage source E is connected through switch S to line 80a. Resistors R1 and R2 are respectively connected at respective ends thereof to line 80b and serve respectively as the fixed arms of a Wheatstone bridge. Link 16 is connected to line 80a, and line 15 and the other end of resistor R1 and respectively connected to a common terminal 80. Line 26 is connected to one side of resistor R12, and the other side of resistor R12 is joined to the other end of resistor R2 by means of common terminal 81. Line 22 is connected by resistance R4 to line 80a. Thermistor T serves as a variable arm of the bridge, the value of the resistance of thermistor T depending upon temperature, and resistors R12, R3 and R4 together serve as a balancing arm of the bridge, the resistance value of which depends upon the position of contact 24. Terminals 80 and 81 are the output terminals of the bridge.

Potentiometer R3 is wound to compensate for any non-linearity of the operating characteristics of thermistor T. In other words, if the resistance of thermistor T changes non-linearly with respect to temperature over the operating temperature range of the device, potentiometer R3 is compensatingly wound.

The output terminals 80 and 81 of the Wheatstone bridge are respectively connected to the input of a difference amplifier which includes PNP transistors T1 and T2. Terminal 80 is connected to the base of transistor T1 and terminal 81 is connected to the base of transistor T2. The emitters of transistors T1 and T2 are connected together by line 83 and are further connected by resistance R5 to line 80a. The collector of transistor T1 is connected by line 85 to line 80b. The collector of transistor T2 is connected by resistor R6 to line 80b and is further connected by line 87 to the base of PNP transistor T3 of a further amplifier stage. The difference amplifier only produces a signal on the base of transistor T3 when the voltage impressed upon terminals 80 and 81 passes through zero.

The emitter of transistor T3 is connected by resistor R8 to line 80a and by resistor R9 to line 80b. The collector of transistor T3 is connected by resistor R7 to line 80b.

The final stage of the circuit includes transistor T4 which is an NPN transistor. The collector of transistor T3 is connected by line 91 to the base of transistor T4. The emitter of transistor T4 is connected by resistor R10 to line 80a and by resistor R11 to line 80b. The collector of transistor T4 is connected by solenoid coil L to line 80a. Diode D is connected across coil L, the plate of diode D being connected to line 80a.

In a representative circuit, transistors T1, T2 and T3 may be 2N524 transistors and transistor T4 may be a 2N1605 transistor. The value of the voltage source E may be three volts and may optionally be obtained by using two 1.5 volt flashlight batteries or a rechargeable battery or any other suitable source.

The nominal resistance values may be as follows:

| | | |
|---|---|---|
| R1 | ohms | 1000 |
| R2 | do | 3500 |
| R3 | ohms limit | 2000 |
| R4 | ohms | 4000 |
| R5 | do | 4700 |
| R6 | do | 10,000 |
| R7 | do | 3300 |
| R8 | do | 270 |
| R9 | do | 170 |
| R10 | do | 75 |
| R11 | do | 15 |
| R12 | do | 270 |

The circuit is advantageous in that there is a low power drain on the voltage source. At the same time, when the bridge is in balance, the solenoid coil L1 receives sufficient current to energize it for sufficient time to activate plunger 51. It will be apparent that only a short pulse of current is needed since once the brake dog is released and moves to braking position, the plunger 51 no longer need be retracted by the solenoid.

Summary of Operation

Since the operation of the various parts has been explained in some detail above, the overall operation of the device need only be summarized at this point. The casing 10, is held in the hand with the tip of probe tube 14 located in position corresponding to the temperature value which is to be measured. Trigger 11 is then cocked by the fingers and is held in cocked position until the temperature measurement is concluded. As the result of the operating or cocking stroke of the trigger, brake dog 41 is locked by plunger 51 in release position; and pawl 67 engages pin 73 and drives sector 66 so as to further drive gear 40 and disc 36, as well as gear 33, thereby moving potentiometer contact 24 to a start position such as illustrated in FIG. 6 and correspondingly moving the counter to a start position. For example, it may be illustratively assumed that the temperature range to be measured runs between 94° and 106° F. It will further be assumed that the thermistor has a positive temperature coefficient of resistance. Accordingly, corresponding to the start of the range, minimum resistance R3 being in circuit, the counter reading as observed in window 13 will illustratively be 94.0° F. Illustratively, it will be assumed that the temperature range is calibrated in tenths of a degree, making a total of 120 discrete digital readings. Correspondingly there will be 120 teeth 37, and generally it can be stated that the number of teeth 37 on disc 36 corresponds to the number of discrete digital readings over the range. Disc 36 is moved to a start turned position by the action of the trigger, corresponding to the start positions of the counter and the potentiometer contact 24.

Just before the conclusion of the cocking stroke of trigger 11, switch S is closed, thereby energizing the electric circuit. At the conclusion of the stroke of trigger 11, pawl 67 clears pin 73, and the wound up spring 39 now operates as a motor to drive the parts through their operating cycle. Pawl 67 maintains switch S closed during this cycle of operation.

The unwinding of spring 39 drives disc 36 in its operating stroke causing contact 24 to advance, with corresponding advance in reading of the counter. Depending upon the temperature of thermistor T (within the operating range), at a corresponding position of contact 24, a null output reading of the bridge is obtained. As a result, solenoid coil L1 is energized, and plunger 51 is retracted, permitting brake dog 41 to move to braking position in which it engages the teeth 37 and stops movement of disc 36. As a result, the contact 24 can no longer advance, and the reading of the counter can no longer change. The time required to obtain the reading, assuming that the temperature to be measured is at the high end of the range, is on the order of magnitude of approximately one second. Once the reading has been obtained, the trigger may be released so that it returns to its normal position. However, brake dog 41 remains in braking position until the next cocking movement of the trigger, so that the position of the counter does not change.

Modifications

FIG. 8 shows a casing 200 which is generally rectangular but of modified shape as compared to casing 10. While the appearance of casing 200 should be apparent without detailed description, it may be particularly pointed out that the front end of casing 200 is somewhat bullet-shaped. The bottom wall 201 and top wall are curved toward each other as indicated at 201a to define a nose 202. Probe 203 extends forwardly from nose 202. The side wall 204 (only one is shown) is extended outwardly at 204a, and wall portion 204a is connected by concave wall 205 to wall portion 201a, thereby creating a sculptured effect. The wall 205 also helps to accommodate the fingers holding the device.

Window 213 in wall 204 corresponds to window 13. Trigger 211 corresponds to trigger 11. The rear wall 220 is in the form of a removable plate which can be removed by pressing button 221 to open a latch (not shown). The removal of plate 220 exposes the battery (not shown). In other respects, the two embodiments are substantially the same.

Numerous other modifications can be made. Thus, instead of varying the winding of potentiometer resistor R3, to compensate for non-linear response of thermistor T with respect to temperature, the readout markings of the counter can be non-linear. Also, electrical compensation or a "bucking" thermistor, or any other suitable means, may be provided to compensate for non-linearity of thermistor T.

Potentiometer contact 24 may be moved by other suitable means, such as a battery-driven electric motor. In certain applications, the contact 24 may be mechanically coupled to an external drive motor, for example, by means of a flexible cable. Optionally, the potentiometer and counter may be located remote from the probe and casing. The potentiometer may be a rotary potentiometer.

Instead of the braking mechanism shown, a clutch mechanism may be used.

In broadest aspect, it is within the scope of the invention to move the potentiometer contact manually to the start of its range, then to close the actuating switch for the electric circuit manually, then to move the potentiometer contact manually to position for zero reading of the bridge and then to have the electric circuit actuate an audible or visual signal which will indicate that balance has been reached so that further movement of the contact will be stopped by the operator. Such visual signal may optionally be a "magic eye" tube or neon lamps. It should be clear from this that one or more of the manual operations can be substituted by trigger means or the like by electromechanical drive means, or by mechanical or electrical motor means. However, I prefer the arrangement disclosed, in which a trigger cocks the mechanism to start position and at the same time actuates the interlock which energizes the electric circuit, because of the simplicity and because of the fact that the mechanism can be received within a small, hand-held casing, with a low power battery voltage source.

It will further be understood that the input of the bridge may be derived from other source than a thermistor, depending upon the physical quantity to be measured. Thus, a mechanically variable resistance such as a potentiometer, may be employed in place of the thermistor, the resistance of the potentiometer being varied in accordance with change in any desired physical quantity which is being measured. Furthermore, the external input may be a photo-cell or other light-sensitive cell having resistance varying in accordance with incident light; a strain gauge, a pressure-sensitive paint or other appropriate input. Also, any variable electric input may be employed.

While I have disclosed a preferred embodiment of the invention, and have indicated various changes, additions and omissions which may be made therein, it will be apparent that various other changes, additions and omissions may be made in the invention without departing from the scope and spirit thereof.

What is claimed is:

1. A meter comprising a balancing circuit having first variable circuit means adapted to be operatively coupled to an external variable quantity to be measured and second variable circuit means adapted to be varied in accordance with the condition of said first variable circuit means to balance said circuit, operator-actuatable means for adjusting said second variable circuit means, a counter operatively coupled to said adjusting means, and electromechanical means coupling said circuit and said adjusting means and responsive to circuit balance for then preventing operation of said adjusting means.

2. Temperature measuring device comprising a potentiometer having a movable contact, indicating means coupled to said contact and giving an indication varying in accordance with the position of said contact, a thermistor, a bridge circuit including as opposing arms said thermistor and said potentiometer and having output terminals, said contact having a bridge balancing position depending upon the temperature of said thermistor, means connected across said output terminals and adapted to produce a signal only when said bridge circuit is in balance and electromechanical means coupling said signal means and said contact and operative in response to a signal to prevent movement of said contact.

3. Temperature measuring device comprising a potentiometer having a movable contact, a counter having counter drive means, means coupling said counter drive means and said contact so that they are movable in unison between respective extreme positions thereof, manually actuatable means first setting said contact to one extreme position thereof, automatic means then moving said contact toward its other extreme position, normally inactive electromechanical brake means for said moving means including a coil and active upon energization of said coil to brake said moving means and thereby stop said counter, a probe, a thermistor in said probe, a bridge circuit including as opposing arms said thermistor and said potentiometer and having a voltage input including a normally open switch and having output terminals, said contact having a balancing position depending upon the temperature of said thermistor wherein the output voltage across said terminals is null, signal generating means coupling said terminals and said coil and adapted to produce energizing current in said coil only when said output voltage is null.

4. Temperature measuring device comprising a potentiometer having a movable contact, a digital counter having counter drive means, first means coupling said counter drive means and said contact so that they are movable in unison between respective extreme positions thereof, unidirectional first biasing means coupled to said movable contact and said counter drive means and biasing them to first extreme positions thereof to increase said bias and movable in the opposite direction by releasing of stored energy in said biasing means to drive said movable contact and said counter drive means toward their other extreme positions, electromechanical means comprising a coil and a brake controlled by said coil, said brake having an unlocking position and a position in which it operatively engages and locks said biasing means, actuating means movable between cocked and normal positions, second biasing means returning said actuating means to normal position, means releasably coupling said actuating means and said first biasing means to move said first biasing means in the direction of higher potential energy during cocking movement of said actuating means, coupling said actuating means and said brake to move said brake to unlocking position during said cocking movement, means then releasably retaining said brake in unlocking position and including said coil and effective upon energization of said coil to release said brake, spring means on said brake effective when it is released to move it to locking position, a normally open switch on said frame, said actuating means engaging and closing said switch while cocked, means releasing said actuating means from coupling to unidirectional biasing said means effective upon cocking of said actuating means to drive said contact and said counter drive means toward their other extreme positions, a probe, a thermistor in said probe, a bridge circuit including as opposing arms said thermistor and said potentiometer and having a voltage input including said switch and having output terminals, said contact having a balancing position as a function of the temperature of said thermistor wherein the output voltage across said terminals is null, signal generating means coupling said terminals and said coil and adapted to produce energizing signal in said coil only when the bridge output voltage is null, said brake then moving to locking position and preventing further change in the counter reading.

5. Temperature measuring device comprising a frame, a potentiometer mounted on said frame and having a movable contact, a digital counter mounted on said frame and having a counter drive shaft, means including a reversible rotatable first gear coupling said contact and said counter shaft so that they are operable in unison upon rotation of said first gear between respective extreme positions thereof, a second gear reversibly rotatably mounted on said frame and meshing with said first gear and having a hub which has a braking surface, braking arm mounted on said frame and movable into and out of position of engagement with said braking surface for respective locking and releasing of said crown gear, a solenoid having a core, said braking arm cooperatively mounted on said core for releasable locking engagement only when said solenoid is de-energized, a third gear mounted coaxially with said second gear to turn in unison therewith, a sector gear and a trigger turnably mounted on said frame on the same pivot, said trigger movable between normal and cocking positions, spring means biasing said trigger to normal position, a pawl lever pivotally mounted on said trigger, a pin on said sector gear, said pawl having a head and being pivotable to engage said head operatively with said sector gear pin in selected relative positions of said trigger and said sector gear, spring means biasing said pawl toward its pin engaging position, said head having cam means positioned to ride over said pin to bring said head into pin engagement position during return stroke of said trigger from cocking to normal position, said head turning said sector gear so as to return said contact and said counter to selected extreme positions thereof, a torsion spring on said second gear torsion spring during the cocking stroke of said trigger, means coupling said trigger and said braking arm so as to be active to move said braking arm to core locking engagement position during cocking stroke of said trigger and so as to be inactive to move said braking arm during return stroke of said trigger, a normally open switch on said frame, said pawl engaging and closing said switch during cocking stroke of said trigger, a stop on said frame, said stop engaging and tripping said pawl so as to disengage said head from said pin after closing of said switch during said trigger cocking stroke, said pawl still holding said switch closed while said trigger is cocked, said torsion spring being active upon disengagement of said head from said pin to turn said second gear in direction so as to move said contact and said counter toward their other extreme positions, a probe, a thermistor in said probe, a bridge circuit including as opposing arms said thermistor and said potentiometer and having a voltage input including said switch and having output terminals, said contact having a balancing position depending upon the temperature of said thermistor wherein the output voltage across said terminals is null, signal generating means coupling said terminals and the coil of said solenoid and adapted to produce energizing current in said coil only when the bridge output voltage is null, said dog then locking said second gear and preventing further change in the counter reading.

References Cited in the file of this patent

UNITED STATES PATENTS

| | | |
|---|---|---|
| 2,368,830 | Harrison | Feb. 6, 1945 |
| 2,653,308 | Allen | Sept. 22, 1953 |
| 2,677,276 | Schmidt | May 4, 1954 |
| 2,684,473 | Shannon | July 20, 1954 |
| 2,806,207 | Edwards | Sept. 10, 1957 |
| 2,848,669 | Smith | Aug. 19, 1958 |
| 2,918,624 | Mayes | Dec. 22, 1959 |